Figure 1:
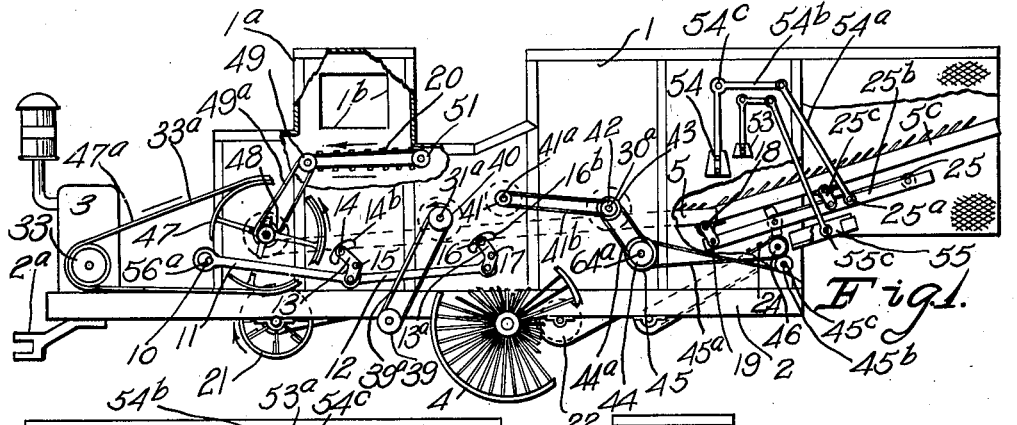

March 30, 1943.  P. P. BAKER  2,315,385
THRESHING MACHINE
Filed Nov. 23, 1940  2 Sheets-Sheet 1

INVENTOR.
Philip P. Baker
BY A. B. Bowman
ATTORNEY.

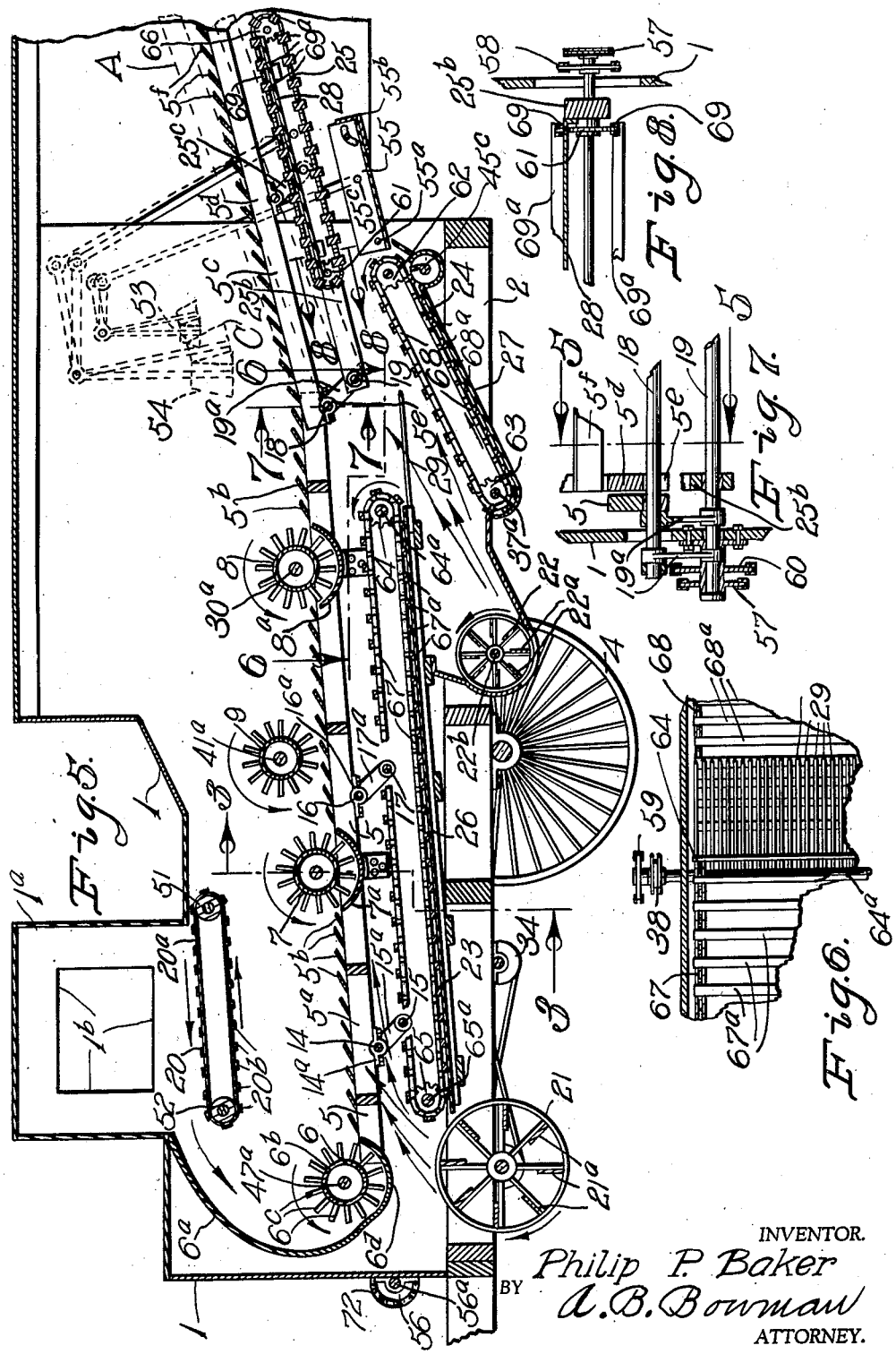

Patented Mar. 30, 1943

2,315,385

UNITED STATES PATENT OFFICE 2,315,385

THRESHING MACHINE

Philip P. Baker, Chula Vista, Calif.

Application November 23, 1940, Serial No. 366,891

10 Claims. (Cl. 130—24)

My invention relates to a threshing machine, more particularly a mobile threshing machine for use on hillsides in the threshing and separating of beans from the cured vines and pods thereof and the objects of my invention are:

First, to provide a threshing machine of this class which is arranged to operate efficiently when going up hill or down hill so that beans are not thrown out with the straw when going up hill and the straw does not clog and accumulate in said machine when going down hill;

Second, to provide a threshing machine of this class in which the rear portion of the threshing table is pivotally and angularly shifted relatively with the front portion of the threshing table by gravity actuated weight members which operate to equalize the respective angles and the chaff and straw restricting operation of said rear portion of said threshing table when my threshing machine is going up or down hill;

Third, to provide a threshing machine of this class in which an inwardly directional operating drag conveyor is arranged in parallel connected relation with the pivotally shiftable rear table portion of the threshing table of my threshing machine whereby said drag conveyor is arranged to conduct beans inwardly into my threshing machine when said beans are shaken from the pivotally shiftable rear table portion;

Fourth, to provide a threshing machine of this class in which the pivotally shiftable rear portion of the threshing table is longitudinally reciprocally shiftable when in various angular relation with the threshing table of my threshing machine;

Fifth, to provide a threshing machine of this class in which a pivotally shiftable rear portion of the threshing table is automatically adjusted relatively to the angle of incline or decline of my threshing machine when going up or down hill whereby a great saving of beans is accomplished together with a saving of time and effort ordinarily used in removing straw from clogged portions of conventional threshing machines of this class when going down hill;

Sixth, to provide a threshing machine of this class in which two blowers are positioned, one in the front portion and one in the rear portion of my threshing machine providing efficient separation of chaff from beans and straw over the entire length of the threshing table of my threshing machine;

Seventh, to provide a threshing machine of this class in which the upper side of the threshing table is substantially flat and extends in chordal relation with the cross sectional outline of the threshing cylinders of my threshing machine;

Eighth, to provide a threshing machine of this class with novel feed mechanism arranged to conduct the cured bean vines onto one of the threshing cylinders of my threshing machine;

Ninth, to provide a threshing machine of this class in which two blowers are positioned, one in the front portion and one in the rear portion of my threshing machine providing an air draft therethrough which tends to force the straw and chaff backwardly through my threshing machine over the entire length of the threshing table thereof;

Tenth, to provide a threshing machine of this class in which an adjustable chaff restricting pan is arranged to be operated by gravity actuated weights for automatically adjusting the proper angle and chaff restricting operation thereof in cooperative relation with various angular positions of my threshing machine;

Eleventh, to provide a novel threshing machine of this class; and

Twelfth, to provide a threshing machine of this class which is very simple and economical of construction in proportion to its utility, efficient in its action and which will not readily deteriorate or get out of order.

Figure 2:
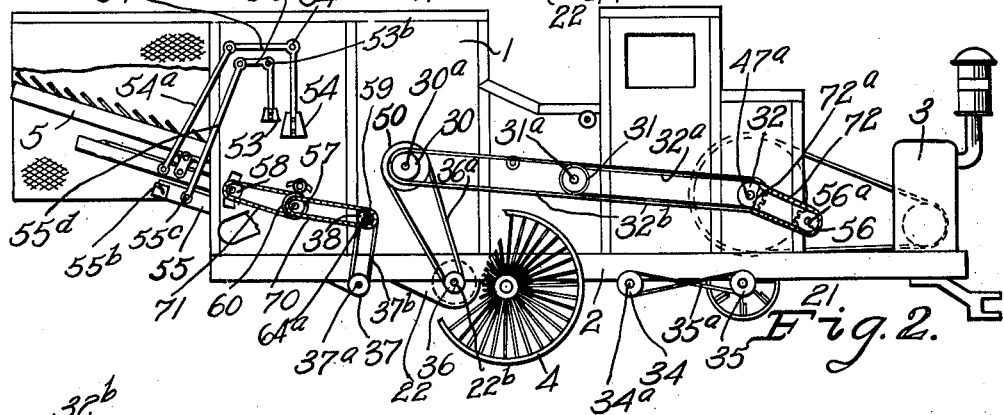
Figures 3, 4:
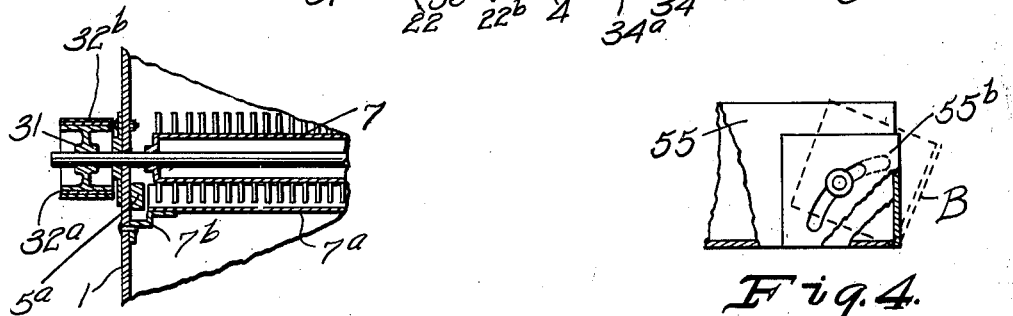

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a fragmentary side elevational view of my threshing machine showing portions broken away and in section to facilitate the illustration; Fig. 2 is a side elevational view of the opposite side of my threshing machine from that as shown in Fig. 1 showing portions broken away to facilitate the illustration; Fig. 3 is a fragmentary sectional view taken from the line 3—3 of Fig. 5; Fig. 4 is an enlarged fragmentary elevational view of the chaff restricting pan of my threshing machine showing portions broken away and in section to facilitate the illustration and showing by dash lines the varying position of a part thereof; Fig. 5 is a fragmentary longitudinal sectional view taken on the plane of the line 5—5 of Fig. 7 showing by dash lines a varying position of the rear portion of the threshing table thereof; Fig. 6 is a fragmentary sectional view taken from the line 6—6 of Fig. 5; Fig. 7 is an enlarged fragmentary sectional view taken from the line 7—7 of Fig. 5 and Fig. 8 is an enlarged fragmentary sectional view taken from the line 8—8 of Fig. 5.

Similar characters of reference refer to similar parts and portions throughout the several views of the drawings:

The threshing machine housing 1, threshing machine frame 2, threshing machine motor 3, threshing machine supporting wheels 4, threshing table 5, cylinders 6, 7 and 8, beater 9, eccentric 10, eccentric link members 11 and 12, table rocker arms 13, table rocker arm shafts 14 to 19 inclusive, feeding conveyor 20, blowers 21 and 22, drag conveyor mechanisms 23, 24 and 25, drag conveyor engaging plates 26, 27 and 28, fingers 29, pulleys 30 to 50 inclusive, rollers 51 and 52, counterweights 53 and 54, chaff restricting pan 55, sprockets 56 to 66 inclusive, and chains 67 to 72 inclusive constitute the principal parts and portions of my threshing machine.

The threshing machine housing 1 is a hollow box-like structure provided with enclosed opposing side walls and an upwardly extending feeder housing 1a in which is positioned an opening 1b arranged for use in receiving the cured bean vines from a conventional pick-up mechanism, not shown. It will be noted that this opening 1b in the feeder housing 1a is arranged to receive the cured bean vines or other produce to be threshed, as desired, from either a pick-up mechanism or from manually operated means, as desired. Said opening 1b is positioned above the feeding conveyor 20 which is an endless fabric belt mounted on the rollers 51 and 52, as shown best in Fig. 5 of the drawings. This feeding conveyor 20 is driven by means of the pulley 49 engaged by the belt 49a on the pulley 48 which is in connection with the shaft 47a, as shown best in Fig. 1 of the drawings. This feeding conveyor 20 is composed of a fabric belt 20a on the outer side of which are positioned transversely disposed conveyor cleats 20b.

The motor 3 is preferably a conventional gas engine and is arranged to operate the pulley 33 in engagement with the belt 33a which engages the pulley 47 on the shaft 47a, as shown best in Fig. 1 of the drawings.

Positioned on this shaft 47a internally of the threshing machine housing 1 is the cylinder 6 which is a substantially conventional threshing machine cylinder and this cylinder 6 is arranged to receive the cured bean vines or other like produce from the feeding conveyor 20, as shown best in Fig. 5 of the drawings. Positioned above the cylinder 6 is a curved plate member 6a, which is in arcuate relation near the peripheral outline of the cylinder 6 at its lower side 6d, as shown best in Fig. 5 of the drawings providing means for feeding the bean vines into the cylinder 6 on a tangent with the peripheral outline thereof. The cylinder 6 is provided with a hollow cylindrical portion 6b to which are secured radially extending fingers 6c, as shown best in Fig. 5 of the drawings.

Secured on the opposite end of the shaft 47a from the drive pulley 47 is the pulley 32. Positioned over the outer side of this pulley 32 is a belt 32a which engages the outer side of the pulley 31 on the shaft 31a. This shaft 31a is arranged to operate the cylinder 7 which is substantially of the same construction as the cylinder 6.

Positioned over the belt 32a on the pulley 32 is a belt 32b which extends past the pulley 31 and engages the pulley 30, as shown best in Fig. 2 of the drawings. This pulley 30 is mounted on the shaft 30a and is arranged to revolve the cylinder 8, as indicated by an arrow in Fig. 5 of the drawings. This cylinder 8 is substantially of the same construction as the threshing cylinders 6 and 7, as hereinbefore described.

Positioned beneath each of the threshing cylinders 6 to 8 inclusive is an arcuate pan portion. These arcuate pan portions are arranged in close arcuate spaced relation with the ends of the finger portions 6c, as shown best in Fig. 5 of the drawings. In cooperative relation with the cylinder 6 is an arcuate pan portion 6d which is a downwardly extending portion of the member 6a, as hereinbefore described. The arcuate pan portions 7a and 8a of the cylinders 7 and 8 are substantially duplicate and are connected at opposite sides of the threshing machine housing 1 by means of brackets 8b and 7b, as shown in detail in Fig. 3 of the drawings.

Secured on the shaft 47a inwardly of the pulley 32 is a sprocket 72a, as shown best in Fig. 2 of the drawings. Positioned on this sprocket 72a is a chain 72 which is arranged to drive the sprocket 56 on the shaft 56a.

Secured on the opposite end of this shaft 56a from the sprocket 56 is the eccentric 10, as shown best in Fig. 1 of the drawings. Engaging this eccentric 10 is an eccentric link member 11 which is pivotally connected at its opposite ends to the angularly and downwardly extending end of the table rocker 13, as shown best in Fig. 1 of the drawings. The eccentric link member 12 is arranged in connection with the table rocker arm 13 at its one end and the table rocker arm 13a at its other end. This eccentric link member 12 interconnects the lower ends of these table rocker arms 13 and 13a, all as shown best in Fig. 1 of the drawings. The table rocker arms 13 and 13a are pivotally mounted on the stationary table rocker arm shafts 15 and 17, as shown best in Fig. 1 of the drawings. The shiftable table rocker arm shafts 14 and 16 are journalled in bearing members 14a and 16a respectively which are secured on the lower side of the threshing table frame members 5a, as shown best in Fig. 5 of the drawings. It will be noted that the shiftable table rocker arm shafts 14 and 16 are arranged to reciprocate in the arcuate slotted portions 14b and 16b in the side walls of the threshing machine housing 1, all as shown best in Fig. 1 of the drawings.

The threshing table 5 is composed of parallel frame members 5a which are reciprocally mounted on the table rocker arm shafts 14, 16 and 18. These table frame members 5a are positioned in adjacent relation with the inner opposing sides of the opposite side walls of the threshing machine housing 1, as shown best in Figs. 3 and 5 of the drawings. Secured on the upper sides of these frame members 5a are angularly disposed cleats 5b. These cleats 5b extend upwardly and backwardly toward the rear end of the threshing machine and the opposite ends of these cleats 5b are secured on the frame members 5a in intermediate relation therewith. The upper sides of these cleats 5a are in alignment with the cylinders 6 to 8 inclusive in chordal relation therewith slightly below the axis thereof. The rear end of the threshing table 5 is pivotally supported on the table rocker arm shaft 18, as shown best in Figs. 5 and 7 of the drawings. Pivotally connected with the table rocker arm shaft 18 and extending backwardly from the rear end of the threshing table 5 is the angularly pivotally shiftable rear table portion 5c which is provided with opposing frame members 5d which are pivotally mounted on the table rocker arm shaft 18 by means of bearings 5e, as shown best in Figs. 5 and 7 of the drawings. As indicated by dash lines A, the rear table portion 5d is angularly shiftable in relation with the threshing table 5, all as shown best in Fig. 5 of the drawings. This rear table portion 5c is also provided with transversely disposed angularly extending cleats 5f similar to the cleats 5b of the threshing table 5. These cleats on the rear table portion 5c communicate with the cleats 5b of the threshing table 5 when in any angularly adjusted position therewith as indicated by dash lines A in Fig. 5 of the drawings.

In connection with the stationarily mounted table rocker arm shaft 19 are the connecting rods 19a, as shown best in Figs. 5 and 7 of the drawings. These connecting rods 19a are pivotally mounted at their opposite ends on the table rocker arm shafts 18 and 19, as shown best in Fig. 7 of the drawings. Referring particularly to Fig. 7 of the drawings, it will be observed that one of these connecting rods 19a is positioned internally of the side wall of the threshing machine housing 1 and the other rocker arm is positioned on the outer side of the threshing machine housing side wall and that the table rocker arm shaft 19 is stationarily journalled in connection with the side wall of the threshing machine housing 1. The stationarily mounted table rocker arm shafts 15 and 17 are similarly journalled in the opposite side walls of the threshing machine housing 1 and are interconnected at their opposite ends by connecting rods 15a and 17a which are similar to the connecting rod 19a as hereinbefore described. These connecting rods 15a and 17a at their opposite ends from the table rocker arm shafts 15 and 17 are journalled on the table rocker arm shafts 14 and 16 respectively, which table rocker arm shafts 14 and 16 are pivotally shiftable in their connected relation with the threshing table 5.

The angularly extending shiftable rear portion 5c of the threshing table 5 is supported in angular relation with the threshing table 5, as shown in Figs. 1 and 5 of the drawings by means of the link 54a in connection with the angular lever 54b of the counterweight 54 which is pivotally mounted on the bolt 54c in connection with the threshing machine housing 1, as shown best in Figs. 1 and 2 of the drawings.

It will be noted that the lower end of these links 54a are pivotally connected with the drag conveyor frame members 25 by means of the bolt 25a, as shown best in Figs. 1 and 5 of the drawings. As shown in Figs. 1 and 2 of the drawings, there counterweights 54 are positioned one on each side of the threshing machine housing and are identical in form and in connected relation therewith at opposite sides of said threshing machine housing 1. The drag conveyor frame members 25b are pivotally supported on the table rocker arm shaft 19 at their inner ends, which shaft 19 is stationarily mounted. Interconnecting these frame portions 25b of the drag conveyor mechanism and the frame portions 5d of the rear table portion 5c are connecting rods 25c, as shown best in Figs. 1 and 5 of the drawings. These connecting rods 25c are arranged to support the rear angularly extending threshing table portion 5c in similar manner to the connecting rods 19a, as hereinbefore described.

It will be here noted that the counterweight 54 in connection with the frame members 25b of the drag conveyor mechanism 25 at opposite sides thereof by means of the links 54a are arranged to shift the angularly extending rear table portion 5c, as indicated by dash lines A by means of the connecting rods 25c in connection with said drag conveyor mechanism frame members 25b, all as shown best in Figs. 1, 5 and 7 of the drawings.

The beater 9 is a revolubly mounted cylindrical member provided with radially extending fingers similar to the finger 6c of the cylinder 6. This beater 9 is revolubly mounted above the upper side of the threshing table 5 and is operated by means of the pulley 41 on the shaft 41a on which the beater 9 is mounted, as shown best in Figs. 1 and 5 of the drawings. Engaging this pulley 41 is a belt 41b which belt 41b engages the pulley 42 on the shaft 30a in opposed relation to the pulley 39 on the opposite side of my threshing machine. Positioned below the threshing table 5 and substantially coextensive therewith is a drag conveyor mechanism 23 consisting of two pairs of spaced sprockets 64 and 65 mounted on shafts 64a and 65a respectively. Positioned over these sprockets 64 and 65 are drag chains 67. Interconnecting these drag chains 67 are conveyor cleats 67a which are arranged to engage and traverse the upper side of the drag conveyor engaging plate 26. The shaft 64a extends outwardly from one side of the threshing machine housing 1, as shown best in Fig. 1 of the drawings. Upon this extending portion of the shaft 64a are fixed the pulleys 44 and 45. The pulley 44 engages a belt 44a. This belt 44a engages the pulley 43 on the shaft 30a, all as shown best in Fig. 1 of the drawings. The pulley 45 on the shaft 64a engages a belt 45a which is arranged in cross engaged relation with the pulley 45b which is arranged to operate the spiral conveyor 45c, which spiral conveyor 45c is a conventional bean transferring mechanism arranged to transport the beans by helically disposed portions thereof to a conventional bean cleaning apparatus which is not shown and which is no part of my present invention.

In connection with the rear end of the drag conveyor engaging plate 26 are finger members 29 which are positioned in spaced relation with each other, as shown best in Fig. 6 of the drawings. Positioned in angularly inclined relation with the finger members 29 and below the same is the drag conveyor mechanism 24. This drag conveyor mechanism 24 consists of spaced revolubly mounted sprockets 62 and 63 upon which are mounted the chains 68. Upon these chains 68 are mounted conveyor cleats 68a, as shown best in Fig. 5 of the drawings. These cleats 68a are similar to the cleats 67a shown in connection with the chains 67, as shown in Fig. 6 of the drawings. These cleats 68a interconnect the chains 68 near opposite side walls of the threshing machine housing 1. The drag conveyor engaging plate 27 is positioned in inclined relation below the sprockets 62 and 63 and in alignment therewith whereby the cleats 68a engage the upper surface of said drag conveyor engaging plate 27, all as shown best in Fig. 5 of the drawings. It will be noted that the spiral conveyor 45c is positioned below the rear inclined portion of the drag conveyor mechanism 24 for receiving beans from the cleats 68a as they pass upwardly along the upper surface of the drag conveyor engaging plate 27. This conveyor mechanism 24 is operated by means of the pulley 37 in engagement with the belt 37b on the pulley 38, which pulley 38 is revolubly operated by the shaft 64a, as shown best in Fig. 2 of the drawings.

The pulley 37 is mounted on the shaft 37a, which shaft 37a operates the sprocket 63 of the drag conveyor mechanism 24. The drag conveyor mechanism 25 is similar in construction to the drag conveyor mechanisms 23 and 24 and is provided with spaced sprockets 61 and 66 which engage the chain 69, as shown best in Figs. 5 and 8 of the drawings.

Interconnecting the chains 69 are cleats 69a, which cleats 69a are provided with offset portions at each end in which the chains 69 are positioned in their connected relation with the cleats 69a. The cleats 69a in connection with the chains 69 are arranged to pass downwardly and inwardly over the upper side of the drag conveyor engaging plate 26, as shown best in Figs. 5 and 8 of the drawings. This drag conveyor mechanism 25 is arranged to convey the beans shaken from the rear table portion 5c inwardly and downwardly so that the beans will fall onto the conveyor mechanism 24 and be conducted into the spiral conveyor 45c, all as shown best in Fig. 5 of the drawings.

Positioned at the rear end of the drag conveyor mechanism 24 below the drag conveyor mechanism 25 is a chaff restricting pan 55. This chaff restricting pan 55 is pivotally mounted on a rod 55a at its inner end and is a sheet metal box-like structure provided with a shiftable end portion 55b which is adjustably connected with the rear end of the chaff restricting pan 55 and is arranged to be shifted, as indicated by dash lines B in Fig. 4 of the drawings providing a variation in the amount of restriction appropriate for limiting the passage of chaff outwardly through the rear end of my threshing machine below the drag conveyor mechanism 25. Pivotally connected with this chaff restricting pan 55 at opposite sides thereof by means of the bolts 55c are link members 55d. These link members 55d are connected at their upper ends to the angular pivotally mounted levers 53a of the counterweights 53, said levers 53a being pivotally mounted on the bolts 53b in connection with the opposite side walls of the threshing machine housing 1, all as shown best in Fig. 2 of the drawings.

The blowers 21 and 22 are substantially cylindrically shaped blowers provided with radially extending fan blade portions 21a and 22a respectively. The blower 21 is revolubly mounted forwardly of and below the one end of the drag conveyor mechanism 23 almost directly below the cylinder 6, as shown best in Fig. 5 of the drawings. This blower 21 is revolubly operated by means of the pulley 35 in engagement with the belt 35a on the pulley 34 which is mounted on the opposite end of the shaft 34a from the pulley 39 on the opposite end thereof. Engaging this pulley 39 is a belt 39a. This belt 39a is in engagement with the pulley 40 on the extended end of the shaft 31a, all as shown best in Figs. 1 and 2 of the drawings. This blower 21 is arranged to cause a draft of air to pass upwardly and backwardly intermediate the cleats 5b of the threshing table 5 around the cylinders 7 and 8 over the drag conveyor mechanism 23 and backwardly through the entire mechanism of my threshing machine. The blower 22 is provided with a shaft 22b on which is positioned the pulley 36, as shown best in Fig. 2 of the drawings. Engaging this pulley 36 is a belt 36a, which belt 36a is driven by the pulley 50, which is fixed on the extending end of the shaft 30a, as shown best in Fig. 2 of the drawings. This blower 22 is arranged to cause a draft of air to pass backwardly and upwardly over the drag conveyor mechanism 24 between the fingers 29, upwardly and backwardly through the rear table portion 5c and around the drag mechanism 25, as indicated by arrows in Fig. 5 of the drawings.

The threshing machine frame 2 is supported on the wheels 4 and is provided with a hitch member 2a at its front end arranged to be connected with a tractor or the like. It will be noted that the entire threshing machine is supported on the wheels 4 and that the front end thereof rests upon the hitch 2a in engagement with a tractor or the like.

The operation of my threshing machine is substantially as follows:

As shown in Fig. 5 of the drawings, cured bean vines may be inserted through the opening 1b in the feeder housing 1a and said cured bean vines drop upon the feeding conveyor 20 and are directed as indicated by the arrow downwardly against the member 6a and pass into the revolving cylinder 6 intermediate the fingers 6c thereof and above the arcuate portion 6d of the member 6a. The bean vines are thrown outwardly upon the cleats 5b toward the cylinder 7. The threshing table 5 is reciprocated backwardly and forwardly and slightly upwardly and downwardly by means of the rocker arms 13 and 13a operated by the eccentric 10 on the shaft 56a. The blower 21 forces a draft of air upwardly between the cleats 5a of the threshing table 5 blowing the chaff backwardly toward the rear portion of the threshing machine. The beans and heavier portions of the chaff and straw fall downwardly and are carried backwardly upon the drag conveyor engaging plate 26 by means of the drag conveyor mechanism 23. As the table 5 reciprocates, the angularly directed cleats 5b force the vines and straw along toward the cylinder 7 which again breaks up the vines, the pods which encase the beans are broken up and the beans falling from the cylinder 7 are carried along by the drag conveyor mechanism 23 toward the inclined drag conveyor mechanism 24. The beater 9 positioned above the table 5 rearwardly of the cylinder 7 provided for breaking action and is arranged to further break up the bean vines and pods in order to release the beans therefrom. A draft of air from the blower 26 cooperates with the reciprocating action of the table 5 for forcing the bean vines backwardly through the threshing machine on the table 5 and the cylinder 8 operates in the same manner as the cylinders 6 and 7 in its pulverizing action upon the bean vines and the pods thereof. As the drag conveyor mechanism 23 conveys the beans and heavier particles toward the end of the drag conveyor engaging plate 26, the beans fall downwardly intermediate the fingers 29 and are picked up by the drag conveyor mechanism 24 and are carried upwardly along the upper side of the drag conveyor engaging plate 27 and are deposited into the spiral conveyor 45c. The bean vines remaining after passing through the cylinder 8 are forced along the inclined rear portion 5c of the threshing table 5 by means of the reciprocating action thereof imparted by the rocker arms 13 and 13a in connection with the eccentric 10. A draft of air passing upwardly from the blower 22 separates the chaff from the beans as the chaff and beans pass upon the fingers 29 and the draft of air also passes upwardly between the angularly extending cleats 5f of the rear portion 5c of the threshing table 5 carrying the chaff outwardly through the rear end of the threshing machine. The greater portion of the chaff passes below the drag conveyor mechanism 25 and outwardly over the upper side of the chaff restricting pan 55. This chaff restricting pan 55 is arranged to restrict the passage of chaff so that the velocity thereof is reduced to such an extent that the beans are not carried outwardly therewith. Any beans which pass between the angularly extending cleats 5f of the table portion 5c fall upon the drag conveyor engaging plate 28 and are carried inwardly and downwardly thereon by means of the drag conveyor mechanism 25. These beans fall downwardly upon the drag conveyor mechanism 24 and are conveyed to the spiral conveyor 45c.

It will be here noted that when a conventional threshing machine is going up hill, the angular relation of the threshing table has a tendency to promote the easy passage of the bean vines and chaff backwardly toward the rear end of said threshing machine with a resultant loss of beans. It is therefore necessary to provide means for compensating this tendency of the bean vines and beans to pass backwardly through the threshing machine with gravitational attraction thereof. When my threshing machine is going up hill the counterweight 54 shifts to the dash line position C raising the rear pivotally mounted threshing table portion 5c to substantially the dash line position A which compensates for the gravitational attraction of the beans and bean vines toward the rear portion of the threshing machine when the front end of the threshing table thereof is slightly higher than the rear portion thereof. The chaff restricting pan 55 is simultaneously elevated in relation with the rear portion 5c of the threshing table 5 for restricting the passage of chaff outwardly through the rear portion of my threshing machine whereby the beans are prevented from being expelled from the rear portion of my threshing machine when going up hill. The drag conveyor mechanism 25 is pivotally mounted and arranged to shift in parallel relation with the rear portion 5c of the threshing table 5, as indicated by dash lines in Fig. 5 of the drawings.

When going down hill the front portion of the threshing table 5 is proportionately lower than the rear portion thereof causing a gravitational attraction toward the front portion of my threshing machine whereby the bean vines have a tendency to back up and clog the mechanism of my threshing machine. To compensate for this clogging tendency, when my threshing machine is going down hill, the counterweight 54 shifts forwardly lowering the rear portion 5c of the threshing table 5 permitting the bean vines to move backwardly from the rear end of the table 5 with comparative ease. The chaff restricting pan 55 is operated in a similar manner by means of the counterweight 53 and this chaff restricting pan 55 shifts downwardly permitting the chaff to pass outwardly therefrom in proportion to the angle at which my threshing machine is ascending or descending. It will be readily understood that the counterweights 53 and 54 provide an automatic means which adjust the passage of straw and chaff through the rear portion of my threshing machine so that the threshing machine does not clog with straw and chaff when going down hill and does not expel the beans from the rear portion thereof when going up hill. The blowers 21 and 22 provide uniform separation of the chaff from the beans and straw providing a more efficient separating action of the cylinder mechanism and the threshing table so that the beans are entirely separated from the vines and chaff as they pass over the threshing table 5 and the pivotally mounted rear table portion 5c.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a threshing machine of the class described, the combination of a reciprocally mounted front threshing table, a rear reciprocally mounted straw carrying threshing table portion communicating with said front threshing table pivotally mounted at its inner end and pivotally mounted gravity actuated weight means connected with said rear threshing table portion arranged to automatically shift said rear threshing table portion in angular relation with said reciprocally mounted front threshing table with varying horizontal inclination of said threshing machine.

2. In a threshing machine of the class described, the combination of a reciprocally mounted front threshing table, a rear reciprocally mounted straw carrying threshing table portion communicating with said front threshing table pivotally mounted at its inner end and pivotally mounted gravity actuated weight means connected with said rear threshing table portion arranged to automatically shift said rear threshing table portion in angular relation with said reciprocally mounted front threshing table with varying horizontal inclination of said threshing machine, and a drag conveyor mechanism in parallel spaced connected relation with said rear threshing table portion positioned below the same and automatically shiftable by said gravity actuated weight means.

3. In a threshing machine of the class described, the combination of a reciprocally mounted front threshing table, a rear reciprocally mounted straw carrying threshing table portion communicating with said front threshing table pivotally mounted at its inner end and pivotally mounted gravity actuated weight means connected with said rear threshing table portion arranged to automatically shift said rear threshing table portion in angular relation with said reciprocally mounted front threshing table with varying horizontal inclination of said threshing machine, a drag conveyor mechanism in parallel spaced connected relation with said rear threshing table portion positioned below the same and automatically shiftable by said gravity actuated weight means, and a chaff restricting pan pivotally mounted at one end below said drag conveyor mechanism and pivotally mounted gravity actuated weight means connected with said chaff restricting pan arranged to shift the same with varying horizontal inclination of said threshing machine.

4. In a threshing machine of the class described, the combination of a reciprocally mounted front threshing table, a rear reciprocally mounted straw carrying threshing table portion communicating with said front threshing table pivotally mounted at its inner end and pivotally mounted gravity actuated weight means connected with said rear reciprocally mounted straw carrying threshing table portion arranged to automatically shift said rear threshing table portion in angular relation with said reciprocally mounted front threshing table with varying horizontal inclination of said threshing machine, a drag conveyor mechanism in parallel spaced connected relation with said rear threshing table portion positioned below the same and automatically shiftable by said gravity actuated weight means, a chaff restricting pan pivotally mounted at one end below said drag conveyor mechanism and pivotally mounted gravity actuated weight means connected with said chaff restricting pan arranged to shift the same with varying horizontal inclination of said threshing machine, said chaff restricting pan provided with an adjustable rear end portion arranged to adjust the restricting area of said rear end portion thereof.

5. In a threshing machine of the class described, the combination of a reciprocally mounted front threshing table, a rear reciprocally mounted straw carrying threshing table portion communicating with said front threshing table pivotally mounted at its inner end, pivotally mounted gravity actuated weight means connected with said rear threshing table portion arranged to automatically shift said rear threshing table portion in angular relation with said reciprocally mounted front threshing table with varying horizontal inclination of said threshing machine, a chaff restricting pan pivotally mounted at one end below said drag conveyor mechanism, pivotally mounted gravity actuated weight means connected with said chaff restricting pan arranged to shift the same with varying horizontal inclination of said threshing machine, and a blower positioned below said threshing table near the front end thereof.

6. In a threshing machine of the class described, the combination of a reciprocally mounted front threshing table, a rear reciprocally mounted straw carrying threshing table portion communicating with said front threshing table pivotally mounted at its inner end, pivotally mounted gravity actuated weight means connected with said rear threshing table portion arranged to automatically shift said rear threshing table portion in angular relation with said reciprocally mounted front threshing table with varying horizontal inclination of said threshing machine, a chaff restricting pan pivotally mounted at one end below said drag conveyor mechanism, pivotally mounted gravity actuated weight means connected with said chaff restricting pan arranged to shift the same with varying horizontal inclination of said threshing machine, a blower positioned below said threshing table near the front end thereof, and a second blower positioned below said threshing table intermediate said first mentioned blower and said chaff restricting pan.

7. In a threshing machine of the class described, the combination of a reciprocally mounted threshing table provided with a substantially flat upper side, spaced revolubly mounted threshing cylinders axially mounted transversely of said threshing table, the upper side of said threshing table being in chordal relation with the cross sectional outline of said threshing cylinders slightly below the axis thereof and extending past opposite sides of some of said threshing cylinders, arcuate pan members in close spaced relation with the periphery of said threshing cylinders at their lower sides, a blower positioned below the front end of said threshing table and arranged to direct air backwardly, a drag conveyor positioned below said threshing table and a plate below said drag conveyor arranged to engage the same.

8. In a threshing machine of the class described, the combination of a reciprocally mounted threshing table provided with a substantially flat upper side, spaced revolubly mounted threshing cylinders axially mounted transversely of said threshing table, the upper side of said threshing table being in chordal relation with the cross sectional outline of said threshing cylinders slightly below the axis thereof and extending past opposite sides of some of said threshing cylinders, arcuate pan members in close spaced relation with the periphery of said threshing cylinders at their lower sides, a blower positioned below the front end of said threshing table and arranged to direct air backwardly, a drag conveyor positioned below said threshing table, a plate below said dag conveyor arranged to engage the same, and another blower positioned near the rear end of said plate and below the same arranged to direct air upwardly and backwardly.

9. In a threshing machine of the class described, the combination of a reciprocally mounted threshing table provided with a substantially flat upper side, spaced revolubly mounted threshing cylinders axially mounted transversely of said threshing table, the upper side of said threshing table being in chordal relation with the cross sectional outline of said threshing cylinders slightly below the axis thereof and extending past opposite sides of some of said threshing cylinders, arcuate pan members in close spaced relation with the periphery of said threshing cylinders at their lower sides, a blower positioned below the front end of said threshing table and arranged to direct air backwardly, a drag conveyor positioned below said threshing table, a plate below said drag conveyor arranged to engage the same, another blower positioned near the rear end of said plate and below the same arranged to direct air upwardly and backwardly, and spaced finger members on the rear end of said plate rearwardly and above said second mentioned blower.

10. In a threshing machine of the class described, the combination of a reciprocally mounted threshing table provided with a substantially flat upper side, spaced revolubly mounted threshing cylinders axially mounted transversely of said threshing table, the upper side of said threshing table being in chordal relation with the cross sectional outline of said threshing cylinders slightly below the axis thereof and extending past opposite sides of some of said threshing cylinders, arcuate pan members in close spaced relation with the lower periphery of said threshing cylinders, a blower positioned below the front end of said threshing table and arranged to direct air backwardly, a drag conveyor positioned below said threshing table, a plate below said drag conveyor arranged to engage the same, and an inclined drag conveyor means positioned below the rear end of said plate.

PHILIP P. BAKER.